(12) United States Patent
Lin et al.

(10) Patent No.: US 7,072,176 B2
(45) Date of Patent: Jul. 4, 2006

(54) MOUNTING APPARATUS FOR CIRCUIT BOARD

(75) Inventors: Kuo-Chih Lin, Tu-chen (TW); Da-Long Sun, Shenzhen (CN); Li Tong, Shenzhen (CN)

(73) Assignees: Hong Fu Jin Precision Industry (Shenzhen) Co., Ltd., Shenzhen (CN); Hon Hai Precision Industry Co., Ltd., Taipei Hsien (TW)

( * ) Notice: Subject to any disclaimer, the term of this patent is extended or adjusted under 35 U.S.C. 154(b) by 204 days.

(21) Appl. No.: 10/389,732

(22) Filed: Mar. 13, 2003

(65) Prior Publication Data

US 2004/0125576 A1 Jul. 1, 2004

(30) Foreign Application Priority Data

Dec. 31, 2002 (TW) .............................. 91221593 U

(51) Int. Cl.
*H05K 5/00* (2006.01)
*H05K 7/00* (2006.01)
(52) U.S. Cl. ...................... 361/685; 361/807; 361/810; 174/138 G
(58) Field of Classification Search ................ 361/807, 361/760, 720, 746, 740, 801, 825, 810, 685, 361/800; 174/138 G, 138; 211/41.17
See application file for complete search history.

(56) References Cited

U.S. PATENT DOCUMENTS

| | | | |
|---|---|---|---|
| 4,703,396 A * | 10/1987 | Fletcher | 361/809 |
| 6,362,978 B1 * | 3/2002 | Boe | 361/825 |
| 6,761,273 B1 * | 7/2004 | Chen et al. | 211/41.17 |
| 6,771,516 B1 * | 8/2004 | Leman et al. | 361/825 |

* cited by examiner

*Primary Examiner*—Kamand Cuneo
*Assistant Examiner*—Hung S. Bui
(74) *Attorney, Agent, or Firm*—Wei Te Chung

(57) ABSTRACT

A motherboard mounting apparatus (10) includes a chassis (50) having a bottom panel (51), a support plate (40) attached to a solder side of a motherboard (60), and a clip (30) mounted to the support plate for fastening the support plate to the bottom panel. The bottom panel defines a plurality of catch slots (52) each having a locking portion (524), and forms two blocks (54). The support plate includes a plurality of catches (44) engaging in the locking portions respectively. An opening (46) is defined in the support plate. The clip includes two recessed portions (34) disposed below the opening. When the support plate is slid forwardly, the recessed portions snappingly engage with the blocks respectively, so that the catches are retained in the locking portions. The support plate is securely attached to the bottom panel. The motherboard is thus securely mounted to the chassis.

16 Claims, 4 Drawing Sheets

MOUNTING APPARATUS FOR CIRCUIT BOARD

BACKGROUND OF THE INVENTION

1. Field of the Invention

The present invention relates to computer enclosures, and more particularly to a computer enclosure having an apparatus for readily and securely mounting a motherboard therein.

2. Related Art

During assembly of a typical personal computer, a motherboard must be fastened to a computer frame or chassis. The motherboard is conventionally mounted to the computer chassis using fasteners such as screws or bolts. China Pats. Nos. 98241276.2 and 00201452.1 each disclose such an arrangement. Coinciding positioning holes are defined in the motherboard and the chassis. The fasteners are inserted into the positioning holes and tightened one by one, thereby securing the motherboard to the chassis.

When installing or removing the motherboard, tightening or removing the fasteners is laborious and time-consuming. In addition, a tool such as a screwdriver or a wrench is usually required. Moreover, the motherboard is prone to be damaged if the tool slips during manipulation of the fasteners.

Thus an improved motherboard mounting apparatus which overcomes the above-mentioned problems is desired.

SUMMARY OF THE INVENTION

Accordingly, an object of the present invention is to provide an apparatus for easy and quick installation and removal of a motherboard to and from equipment such as a computer enclosure.

To achieve the above-mentioned object, a motherboard mounting apparatus in accordance with a preferred embodiment of the present invention comprises a chassis having a bottom panel, a support plate attached to a solder side of a motherboard, and a clip mounted to the support plate for fastening the support plate to the bottom panel. The bottom panel defines a plurality of catch slots each having a locking portion. A pair of blocks is formed on a recessed edge portion of the bottom panel. The support plate comprises a plurality of catches engaging in the locking portions respectively. An opening is defined in the support plate. The clip comprises a main body having a pair of recessed portions at respective opposite sides thereof. The recessed portions are disposed below the opening. When the support plate is slid forwardly, the recessed portions snappingly engage with front sides of the blocks respectively, so that the catches are retained in the locking portions. The support plate is securely attached to the bottom panel. The motherboard is thus securely mounted to the chassis.

Other objects, advantages and novel features of the present invention will be drawn from the following detailed description of the preferred embodiment of the present invention with attached drawings, in which:

DESCRIPTION OF THE PREFERRED EMBODIMENT

The present invention will be described in its preferred embodiment, and in conjunction with a motherboard 60.

Figure 1:
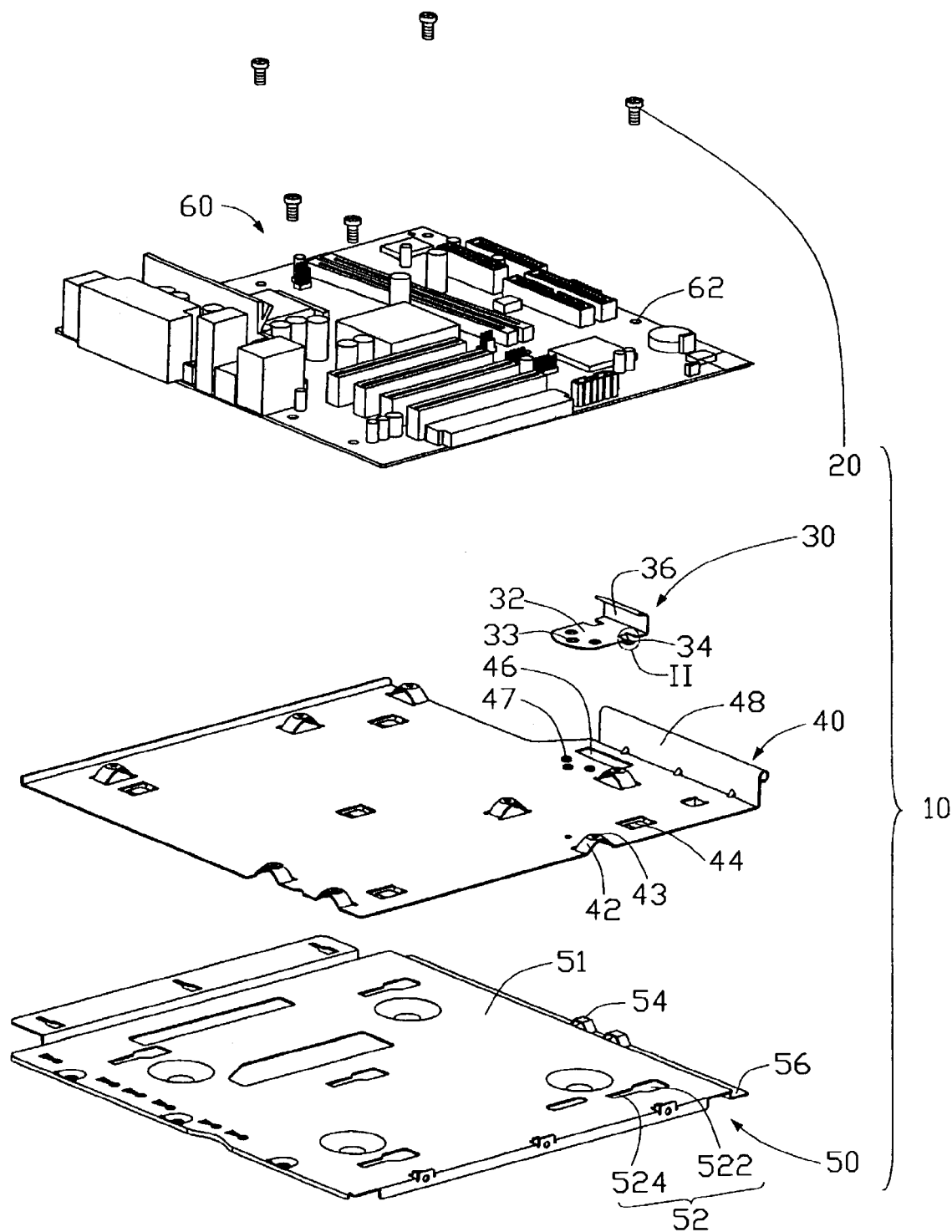
FIG. 1 is an exploded, isometric view of a motherboard mounting apparatus in accordance with the preferred embodiment of the present invention, together with a motherboard, the mounting apparatus comprising a chassis, a support plate, a clip and a plurality of screws.

FIG. 1 shows a motherboard mounting apparatus 10 in accordance with the preferred embodiment of the present invention, together with the motherboard 60. A plurality of positioning holes 62 is defined in the motherboard 60. The mounting apparatus 10 comprises a chassis 50, a support plate 40 adapted to be attached to a solder side of the motherboard 60, a clip 30 for retaining the support plate 40 to the chassis 50, and a plurality of screws 20 for fastening the motherboard 60 to the support plate 40.

The chassis 50 comprises a bottom panel 51 having a recessed edge portion 56. A plurality of spaced catch slots 52 is defined in the bottom panel 51. Each catch slot 52 comprises a wide guide portion 522, and a narrow locking portion 524 in front of and in communication with the guide portion 522. A pair of blocks 54 is stamped upwardly from a middle portion of the recessed edge portion 56.

Figure 4:
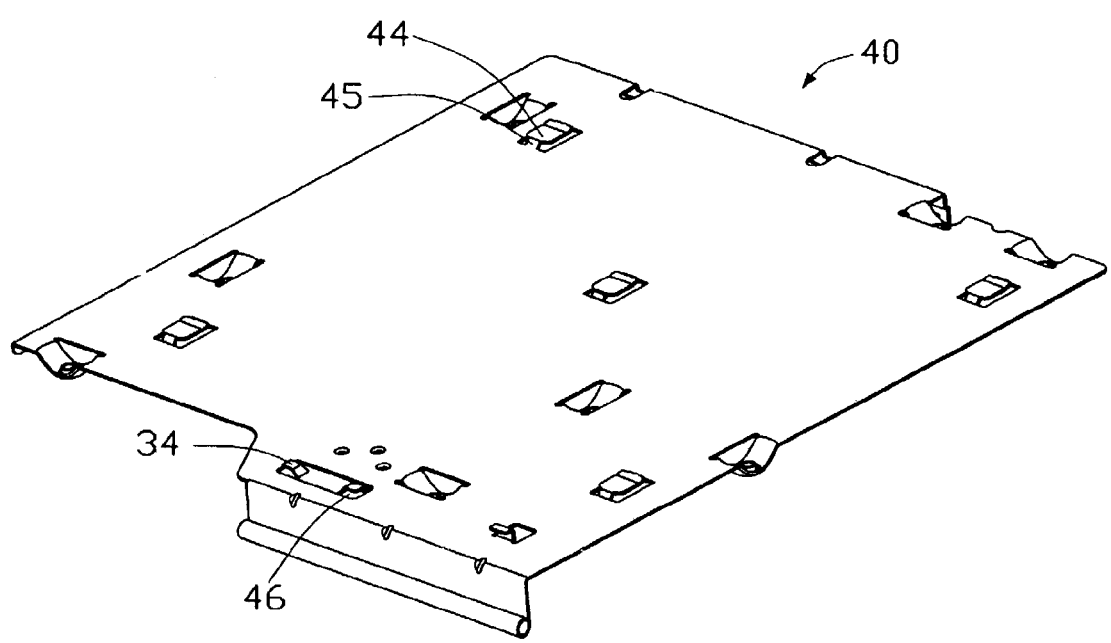
FIG. 4 is similar to FIG. 3, but showing the support plate and clip inverted.
Figure 5:
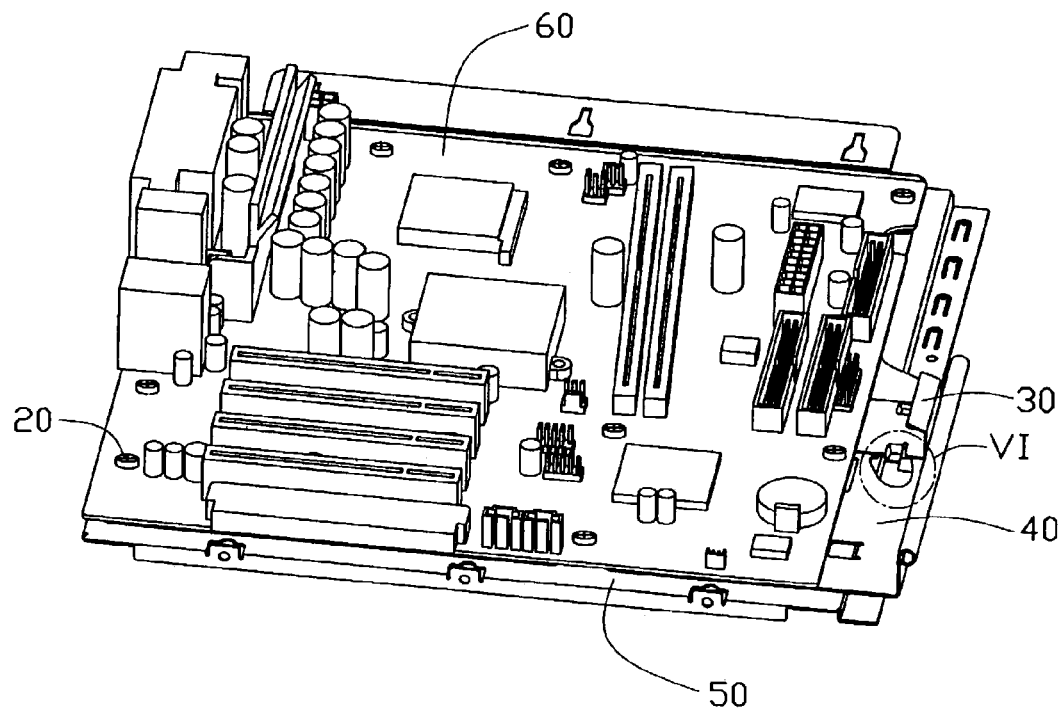
FIG. 5 is an assembled view of FIG. 1, viewed from another aspect.
Figure 6:
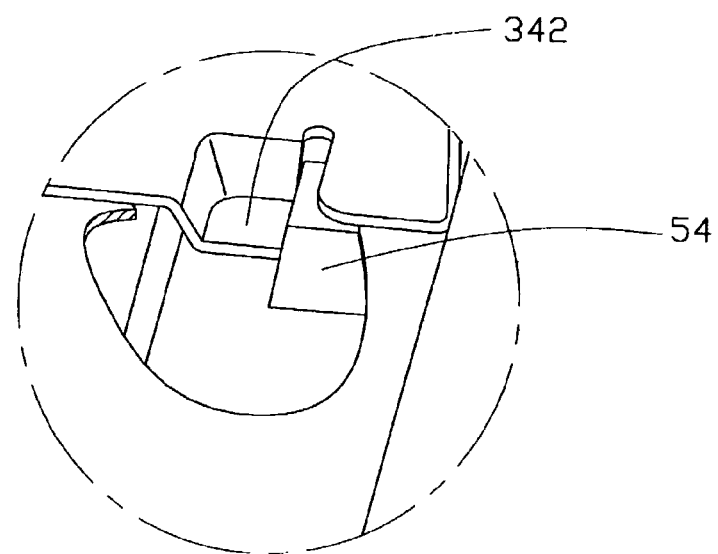
FIG. 6 is an enlarged view of an encircled portion VI of FIG. 5.

The support plate 40 comprises a bent plate 48 extending upwardly from a rear side thereof. A rectangular opening 46 is defined in the support plate 40 near the bent plate 48. Three mounting posts 47 are formed on the support plate 40 in front of the opening 46. A plurality of spaced protrusions 42 is stamped upwardly from the support plate 40, corresponding to the positioning holes 62 of the motherboard 60. Each protrusion 42 defines a threaded hole 43 in a top portion thereof. A plurality of spaced catches 44 is stamped downwardly from the support plate 40, corresponding to the catch slots 52 of the bottom panel 51. Referring also to FIG. 4, each catch 44 comprises a generally horizontal portion, and a neck 45 connecting between the horizontal portion and the support plate 40.

Figure 2:
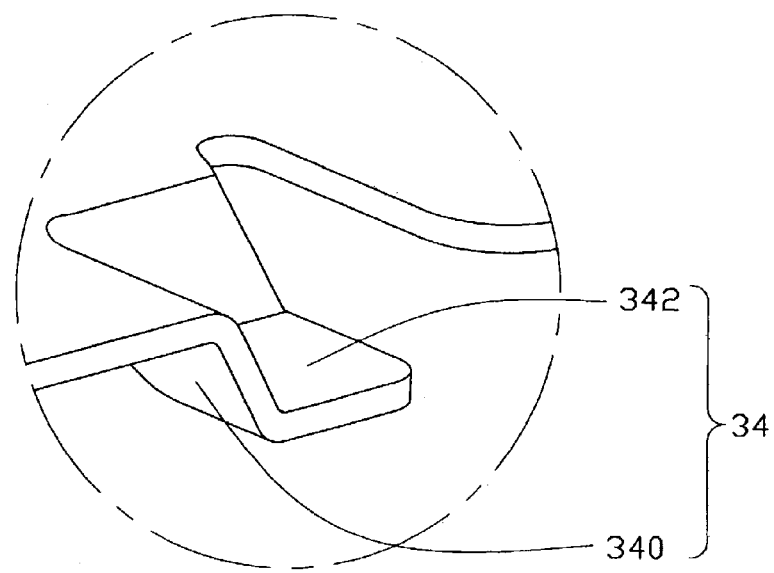
FIG. 2 is an enlarged view of an encircled portion II of FIG. 1.
Figure 3:
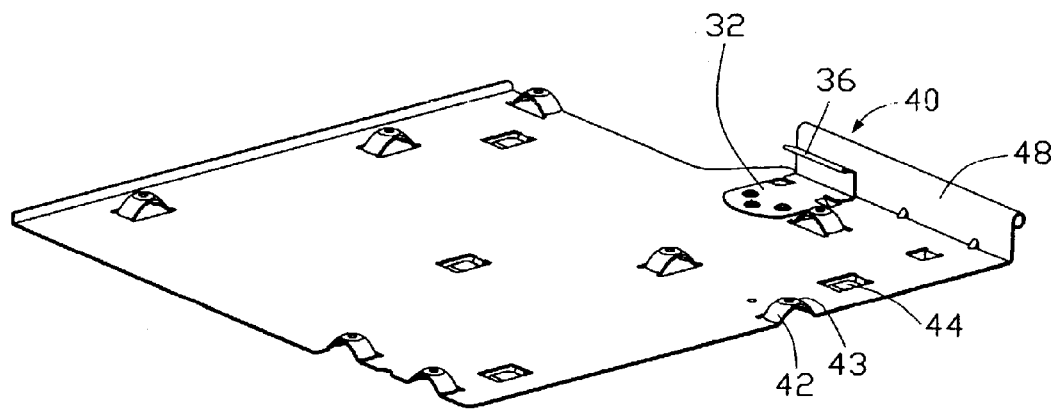
FIG. 3 is an isometric view of the support plate and the clip of FIG. 1 attached together.

The clip 30 comprises a main body 32, and a tab 36 extending upwardly and then forwardly from a rear side of the main body 32. Three mounting holes 33 are defined in the main body 32, corresponding to the mounting posts 47 of the support plate 40. A pair of recessed portions 34 is defined in the main body 32 at respective opposite sides thereof near the tab 36, corresponding to the opening 46 of the support plate 40. Referring also to FIG. 2, each recessed portion 34 comprises an inclined portion 340 extending obliquely from the main body 32, and a horizontal engaging portion 342 extending from a distal edge of the inclined portion 340.

Referring to FIGS. 3 through 6, in assembly, the clip 30 is placed on the support plate 40 so that the mounting posts 47 of the support plate 40 extend through the mounting holes 33 of the main body 32 of the clip 30 respectively. The mounting posts 47 are hammered so that the clip 30 is fixedly attached to the support plate 40. The recessed portions 34 of the main body 32 are extended through the opening 46 and disposed at an underside of the support plate 40.

The motherboard 60 is fastened to the support plate 40 with the screws 20. The combined motherboard 60, clip 30 and support plate 40 is placed on the bottom panel 51. The catches 44 of the support plate 40 are extended into the guide portions 522 of the catch slots 52 of the bottom panel 51 respectively. In this position, the recessed portions 34 are located at rear sides of the blocks 54 of the recessed edge portion 56 of the bottom panel 51.

The bent plate 48 of the support plate 40 is pushed forwardly, so that the necks 45 of the catches 44 are slid into the locking portions 524 of the catch slots 52 respectively. The inclined portions 340 of the recessed portions 34 slidingly and resiliently abut against the blocks 54 respectively. As a result, the recessed portions 34 are deformed upwardly.

The bent plate 48 is pushed further forwardly, so that the necks 45 of the catches 44 are slid forwardly to reach front ends of the locking portions 524. The engaging portions 342 of the recessed portions 34 ride over the blocks 54 to snappingly engage with front sides of the blocks 54 respectively, so that the catches 44 are retained in the locking portions 524. The support plate 40 is securely attached to the bottom panel 51. Thus, the motherboard 60 is securely mounted to the chassis 50.

To remove the motherboard 60 from the chassis 50, the tab 36 of the clip 30 is pulled upwardly that the recessed portions 34 of the clip 30 are disposed slightly higher than the blocks 54 of the chassis 50. The bent plate 48 of the support plate 40 is pushed rearwardly to slide the necks 45 of the catches 44 to disengage from the locking portions 524 to the guide portions 522 of the catch slots 52 of the bottom panel 51. The combined motherboard 60, clip 30 and support plate 40 is then easily removed from the chassis 50.

In the mounting apparatus of the present invention, the support plate 40 is slidably attached to the chassis 50, and the recessed portions 34 of the clip 30 are snappingly engaged with the blocks 54 of the chassis 50. This allows quick and convenient installation and removal of the motherboard 60.

It is understood that the invention may be embodied in other forms without departing from the spirit thereof. Thus, the present example and embodiment are to be considered in all respects as illustrative and not restrictive, and the invention is not to be limited to the details given herein.

The invention claimed is:

1. A mounting apparatus for a circuit board, comprising:
   a panel defining a plurality of slots therein;
   a support member having one side adapted for positioning the circuit board thereon, and comprising a plurality of catches at an opposite side thereof, the catches slidably engaging in the slots respectively; and
   a deflectable clip snappingly engaged between the support member and the panel to retain the support member on the panel, wherein a block is formed on the panel, and the clip has a recessed portion for engaging with the block;
   whereby the circuit board is securely mounted to the panel.

2. The mounting apparatus as described in claim 1, wherein the clip comprises a main body fixedly mounted to the support member, and a tab extending from one side of the main body for releasing the support member from the panel.

3. The mounting apparatus as described in claim 1, wherein the support member defines an opening, and the recessed portion extending through the opening and engaging with the block.

4. The mounting apparatus as described in claim 1, wherein the recessed portion comprises an engaging portion abutting the block.

5. The mounting apparatus as described in claim 1, wherein each of the slots comprises a locking portion, and each of the catches comprises a neck portion engaging in a corresponding locking portion.

6. The mounting apparatus as described in claim 1, wherein the support member comprises a bent plate at a side thereof for facilitating manual operation.

7. The mounting apparatus as described in claim 1, wherein the panel comprises a recessed edge portion, and the block is provided on the recessed edge portion.

8. The mounting apparatus as described in claim 1, wherein the clip is fixedly mounted on the support member.

9. The mounting apparatus as described in claim 1, wherein the clip is deflectable in a vertical direction.

10. A circuit board assembly comprising:
    a panel with a block formed thereon;
    a circuit board;
    a support member fixedly mounted to a solder side of the circuit board, the support member slidably attached to the panel and located between the circuit board and the panel; and
    a clip fixedly mounted to the support member, the clip comprising latch means snappingly engaging with the block to prevent the support member from moving in a first direction.

11. The assembly as described in claim 10, wherein the panel defines a plurality of slots therein, and the support member comprises a plurality of catches slidably engaged in the slots respectively.

12. The assembly as described in claim 11, wherein each of the slots has a locking portion, and each of the catches comprises a neck portion engaging in a corresponding locking portion to prevent the support member from moving in a second direction the is opposite to the first direction.

13. The assembly as described in claim 10, wherein the latch means comprises an engaging portion extending from the clip, the engaging portion abutting the block.

14. The assembly as described in claim 10, wherein the panel comprises a recessed edge portion, and the block is provided on the recessed edge portion.

15. The assembly as described in claim 10, wherein the clip comprises a main body fixedly mounted to the support member, and a tab extends from one side of the main body for releasing the support member from the panel.

16. The assembly as described in claim 10, wherein the support member comprises a bent plate at a side thereof for facilitating manual operation.

* * * * *